(12) United States Patent
Homma et al.

(10) Patent No.: US 6,599,610 B2
(45) Date of Patent: Jul. 29, 2003

(54) MULTIAXIALLY STITCHED BASE MATERIAL FOR REINFORCING AND FIBER REINFORCED PLASTIC, AND METHOD FOR PREPARING THEM

(75) Inventors: Kiyoshi Homma, Shiga (JP); Akira Nishimura, Ehime (JP)

(73) Assignee: Toray Industries, Inc. (JP)

( * ) Notice: Subject to any disclaimer, the term of this patent is extended or adjusted under 35 U.S.C. 154(b) by 200 days.

(21) Appl. No.: 09/958,046

(22) PCT Filed: Feb. 27, 2001

(86) PCT No.: PCT/JP01/01449
§ 371 (c)(1),
(2), (4) Date: Oct. 3, 2001

(87) PCT Pub. No.: WO01/63033
PCT Pub. Date: Aug. 30, 2001

(65) Prior Publication Data
US 2002/0160146 A1 Oct. 31, 2002

(30) Foreign Application Priority Data
Feb. 28, 2000 (JP) .......................................... 2000-051156
Jul. 14, 2000 (JP) .......................................... 2000-213873

(51) Int. Cl.⁷ ................................................ B32B 3/06
(52) U.S. Cl. ........................ 428/102; 428/105; 428/113; 428/902
(58) Field of Search ................................ 428/102, 105, 428/113, 902, 114

(56) References Cited

U.S. PATENT DOCUMENTS 4,550,045 A     10/1985     Hutson

FOREIGN PATENT DOCUMENTS

WO          WO 98/44183          10/1998

*Primary Examiner*—Alexander S. Thomas
(74) *Attorney, Agent, or Firm*—Piper Rudnick LLP (57) ABSTRACT

A stitched laminate, in which plural sheets respectively having plural tow-like carbon fibers arranged in parallel to each other are laminated, with the orienting directions of the carbon fiber yarns of the respective sheets kept at different angles against a reference direction, and are stitched integrally using stitching threads. The fineness of each of the carbon fiber yarns is in a range of 1,200 to 17,000 Tex, and the pitch of the arranged carbon fibers yarns is in the range of 8 to 60 mm. In the sheets, the arranged carbon fiber yarns are widened in yarn width to ensure that no gap substantially exists between the respectively adjacent carbon fiber yarns. The plural carbon fiber yarns supplied to form sheets are respectively brought into contact with plural rollers, to be bent and widened in yarn width.

27 Claims, 4 Drawing Sheets

MULTIAXIALLY STITCHED BASE MATERIAL FOR REINFORCING AND FIBER REINFORCED PLASTIC, AND METHOD FOR PREPARING THEM

TECHNICAL FIELD

The present invention relates to a stitched multiaxial reinforcing laminate composed of carbon fiber yarns, in more detail, a stitched multiaxial reinforcing laminate having a thin thickness composed of thick tow-like carbon fiber yarns, a fiber-reinforced plastic using the same, and a production process of the stitched multiaxial reinforcing laminate.

BACKGROUND ART

Carbon fibers have a low specific gravity, high tensile strength and high tensile modulus of elasticity, and carbon fiber reinforced plastics obtained by immobilizing them with a resin (hereinafter called CFRP) are materials having high specific strengths and high specific moduli. The materials are popularly used as component materials of spacecraft, aircraft and sports & leisure articles, and recently, their use for general industrial applications such as motor vehicles is actively studied.

A conventional CFRP is produced, for example, by a method of impregnating a woven fabric with a unit weight of 200 to 300 g/m$^2$ formed using thin carbon fiber yarns with a fineness of 200 Tex as warp and weft, with a resin, to make a prepreg, laminating plural sheets of the prepreg, and forming the laminate in an autoclave.

Since the conventional CFRP is composed of thin carbon fiber yarns, the carbon fibers are very uniformly dispersed in the CFRP, and the surface of the CFRP is smooth. However, thin carbon fiber yarns are expensive since their productivity is low. The woven fabric composed of them is also low in productivity since it must be produced using numerous carbon fiber yarns. So, the production cost of the woven fabric is high, and the conventional CFRP produced using the woven fabric is a very expensive material disadvantageously.

If the CFRP is isotropic, the strength and other properties can be further improved. For this reason, in the case where at least four sheets of a prepreg are laminated, they are laminated to have carbon fiber yarn intersecting angles of 0°/90°/±45°, and this method is called a pseudo-isotropic lamination method. In this case, as the sheets of the prepreg used for the ±45° layers are obtained by bias-cutting the prepreg used for the 0° and 90° layers. In addition to the necessity of this cutting step, the cutting involves a large loss of the prepreg. So, the pseudo-isotropic CFRP obtained like this has a problem of being expensive.

Even such an expensive material can be used for the aircraft because of the large weight reduction effect obtained. However, the recently examined CFRP expected for general industrial applications such as motor vehicles is requested to be lower in price. That is, the CFRP available for general industrial applications must be able to be produced at a low cost as an essential condition.

As a means for solving the problem, the use of a stitched multiaxial laminate obtained by stitching pseudo-isotropically laminated reinforcing fibers integrally by means of stitching threads attracts attention. Since the laminate is pseudo-isotropic already as one board, neither bias cutting work nor additional lamination work is necessary. In this sense, the laminate is expected as a low cost material.

In the stitched multiaxial laminate, plural sheets, each having numerous thin reinforcing fiber yarns arranged in one direction, are laminated and stitched integrally by means of stitching threads. In the case where the stitched multiaxial laminate is used as a material for CFRP, the unit weight of reinforcing fibers of each sheet must be about 200 g/m$^2$. However, in the case where carbon fibers are used as reinforcing fibers of the stitched multiaxial laminate, since the production cost of thin carbon fiber yarns is very high, the stitched multiaxial laminate obtained becomes expensive and cannot be used for general industrial applications disadvantageously.

If it is attempted to use thick carbon fiber yarns low in production cost for obtaining a stitched multiaxial laminate with fibers dispersed uniformly, the laminate has a high unit weight and cannot be used for other than special applications. If it is attempted to obtain a laminate with a practical unit weight, the pitch of the arranged numerous carbon fiber yarns becomes large, and a problem arises that large gaps are formed between the respectively adjacent carbon fiber yarns. If the laminate is used for forming a CFRP, the gaps in the formed CFRP become resin-rich portions, and a problem arises that when a stress acts on the CFRP, the stress is concentrated at the resin-rich portions, to cause rupture at a low external force. Furthermore, the shrinkage caused when the resin is hardened depresses the resin-rich portions corresponding to the gaps between the respectively adjacent carbon fiber yarns, and a problem arises that a CFRP with a smooth surface cannot be obtained. Therefore, in the present situations, such a CFRP cannot be used for applications requiring reliability and accuracy.

The object of the invention is to solve the above-mentioned various problems of the prior art by providing a thin stitched multiaxial reinforcing laminate, in which, even if thick tow-like carbon fiber yarns are used, the carbon fiber yarns are uniformly arranged without forming any gap between the respectively adjacent carbon fiber yarns. The object of the invention also includes providing a process for producing the stitched multiaxial laminate.

DISCLOSURE OF THE INVENTION

The stitched multiaxial reinforcing laminate of the invention for achieving the above object is as follows.

A stitched multiaxial reinforcing laminate, in which plural sheets, each having plural tow-like carbon fiber yarns arranged in parallel to each other, are laminated and stitched integrally by means of stitching threads, to ensure that the directions of the arranged carbon fiber yarn of the respective sheets are kept at different angles against a reference direction, characterized in that the tow-like carbon fiber yarns have a fineness of 1,200 to 17,000 Tex respectively and are arranged at a pitch of 8 to 60 mm, with the yarn width of each of the carbon fiber yarns widened to the pitch of the arranged carbon fiber yarns.

In the stitched multiaxial reinforcing laminate of the invention, it is preferable that the pitch of the arranged carbon fiber yarns is in a range of 20 to 60 mm.

In the stitched multiaxial reinforcing laminate of the invention, it is preferable that the yarn width of each of the carbon fibers is not less than double the original yarn width. In the stitched multiaxial reinforcing laminate of the invention, it is preferable that the yarn width of each of the carbon fibers is double to five times the original yarn width.

In the stitched multiaxial reinforcing laminate of the invention, it is preferable that the hook drop value of the carbon fiber yarns is in a range of 4 to 80 cm.

In the stitched multiaxial reinforcing laminate of the invention, it is preferable that a sizing agent is added to the carbon fiber yarns, and that the amount of the deposited sizing agent is in a range of 0.2 to 1.5 wt %.

In the stitched multiaxial reinforcing laminate of the invention, it is preferable that the amount of the deposited sizing agent is in a range of 0.2 to 0.6 wt %.

In the stitched multiaxial reinforcing laminate of the invention, it is preferable that the unit weight of the carbon fiber yarns in each of the sheets is in a range of 50 to 300 g/m².

In the stitched multiaxial reinforcing laminate of the invention, it is preferable that said unit weight is in a range of 100 to 200 g/m².

In the stitched multiaxial reinforcing laminate of the invention, it is preferable that at least one sheet of the plural sheets has said carbon fiber yarns arranged substantially at an angle of 0° in reference to the direction in which said stitching threads extend, and that at least one sheet of the plural sheets has said carbon fiber yarns arranged substantially at an angle of 90° C. in reference to the direction in which said stitching threads extend.

In the stitched multiaxial reinforcing laminate of the invention, it is preferable that at least one sheet of the plural sheets has said carbon fiber yarns arranged substantially at an angle of +45° in reference to the direction in which said stitching threads extend, and that at least one sheet of the plural sheets has said carbon fiber yarns arranged substantially at an angle of −45° in reference to the direction in which said stitching threads extend.

In the stitched multiaxial reinforcing laminate of the invention, it is preferable that said stitched multiaxial laminate contains at least one non-woven fabric layer composed is of reinforcing fibers.

The fiber-reinforced plastic of the invention for achieving the above object comprises a matrix resin and the stitched multiaxial reinforcing laminate of the invention.

The process for producing a stitched multiaxial reinforcing laminate of the invention for achieving the above object is as follows.

A process for producing a stitched multiaxial reinforcing laminate, comprising a carbon fiber yarn-arranging step of arranging plural tow-like carbon fiber yarns respectively having a fineness of 1,200 to 17,000 Tex at a pitch of 8 to 60 mm, with the yarn width of each of the carbon fiber yarns widened to the pitch of the arranged yarns in one direction, a sheet-forming step of forming the arranged carbon fiber yarns into sheets respectively with a carbon fiber yarn unit weight of 50 to 300 g/m², a sheet-laminating step of laminating the formed plural sheets to ensure that the directions of the arranged carbon fiber yarns of the respective sheets are kept at different angles against a reference direction, and an integrating step of stitching the obtained sheet laminate integrally by means of stitching threads.

In the process for producing a stitched multiaxial reinforcing laminate of the invention, it is preferable that the unit weight is in a range of 100 to 200 g/m².

In the process for producing a stitched multiaxial reinforcing laminate of the invention, it is preferable that, in the carbon fiber yarn-arranging step, the carbon fiber yarns pass along plural width-widening rollers provided in the running direction, to be bent and widened in yarn width.

In the process for producing a stitched multiaxial reinforcing laminate of the invention, it is preferable that at least one of the plural width-widening rollers is a vibrating roller vibrating in the axial direction of the roller, and the carbon fiber yarns passing along it are widened in yarn width by the vibration.

In the process for producing a stitched multiaxial reinforcing laminate of the invention, it is preferable that the vibration frequency of the vibrating roller is in a range of 10 to 100 Hz.

In the process for producing a stitched multiaxial reinforcing laminate of the invention, it is preferable that, in is the sheet-forming step, a first width-widening roller device consisting of plural width-widening rollers and a second width-widening roller device consisting of plural width-widening rollers are used, that the numerous carbon fiber yarns arranged at a predetermined pitch are supplied to the first and second width-widening devices in such a manner that every other yarn is supplied to either of the width-widening devices while the remaining every other yarn is supplied to the other width-widening device, that the carbon fiber yarns are widened to wider than the pitch of the yarns arranged when supplied, and that the carbon fiber yarns delivered from the respective width-widening roller devices are positioned adjacently to each other in the formed sheet.

In the process for producing a stitched multiaxial reinforcing laminate of the invention, it is preferable that a fluid is blown to the carbon fiber yarns for widening them in yarn width at a position between the carbon fiber yarn-arranging step and the sheet-forming step.

In the process for producing a stitched multiaxial reinforcing laminate of the invention, it is preferable that the fluid is air.

In the process for producing a stitched multiaxial reinforcing laminate of the invention, it is preferable that the air is blown from a plurality of blow holes arranged at least in one row in parallel to the orienting direction of the carbon fiber yarns.

In the process for producing a stitched multiaxial reinforcing laminate of the invention, it is preferable that the fluid is blown from above a porous guide placed above each of the arranged carbon fiber yarns.

In the process for producing a stitched multiaxial reinforcing laminate of the invention, it is preferable that the under surface of the porous guide is kept in contact with the upper surface of the arranged carbon fiber yars.

In the process for producing a stitched multiaxial reinforcing laminate of the invention, it is preferable that the yarn width of each of the arranged carbon fiber yarns is not less than double the original yarn width of each of the carbon fiber yarns.

In the process for producing a stitched multiaxial reinforcing laminate of the invention, it is preferable that the yarn width of each of the arranged carbon fiber yarns is double to five times the original yarn width of each of the carbon fiber yarns.

In the process for producing a stitched multiaxial reinforcing laminate of the invention, it is preferable that the orienting directions of the carbon fibers in the sheets are at least two angles selected from 0°, ±45° and 90° in reference to the direction in which the stitching threads extend.

THE BEST MODES FOR CARRYING OUT THE INVENTION

The carbon fiber yarns used in the stitched multiaxial reinforcing laminate of the invention consist of numerous carbon filaments, and each of the yarns is has a fineness in a range of 1,200 to 17,000 Tex and is formed like a tow. It is more preferable that the fineness of the yarn is in a range of 1,200 to 10,000 Tex. It is preferable that the diameter of each of the carbon filaments is in a range of 5 to 15 microns. It is preferable that each of the carbon fiber yarns is a set of 20,000 to 200,000 carbon filaments.

Since the carbon fiber yarns are produced as thick yarns, the productivity is high, and the production cost is low.

If carbon fiber yarns thinner than 1,200 Tex are used, it is easy to produce a sheet, in which the respective carbon fiber yarns and the respective filaments constituting them are uniformly dispersed. However, since the production cost of thin carbon fiber yarns is high, the sheet production cost becomes also high.

Thick carbon fiber yarns with a fineness of more than 17.000 Tex are lower in production cost, but in order to form a thin sheet, it is necessary to greatly widen the carbon fiber yarns in yarn width. However, it is difficult to widen the ordinary carbon fibers in yarn width due to, for example, filament entanglements, and it is substantially difficult to produce a sheet, in which the carbon fiber yarns and the respective filaments constituting them are uniformly dispersed.

It is preferable that the carbon fiber yarns used in the stitched multiaxial reinforcing laminate of the invention are composed of filaments less likely to be entangled with each other and are good in filament spreadability. The entangling degree of filaments in each carbon fiber yarn can be known in reference to the hook drop value.

It is preferable that the hook drop value ($FD_{(15g)}$) of the carbon fiber yarns used in the stitched multiaxial reinforcing laminate of the invention is in a range of 4 to 80 cm. It is more preferable that the hook drop value ($FD_{(15g)}$) is in a range of 10 to 80 cm, since the filament spreadability becomes higher, making it easier to greatly widen the yarn width. The method of measuring the hook drop value is described later.

Carbon fiber yarns with a hook drop value of less than 4 cm have filaments very likely to be entangled with each other and are poor in yarn spreadability. So, if the carbon fiber yarns are arranged at a larger pitch for forming a thinner sheet, gaps are formed between the arranged carbon fiber yarns, making it difficult to form a uniform sheet.

Carbon fiber yarns with a hook drop value of more than 80 cm have filaments less likely to be entangled with each other and are good in yarn spreadability preferably for obtaining a thin sheet. However, since the yarn bundling integrity is poor, they are poor in handling convenience and low in advanced workability. Method for measuring the hook drop value:

For measuring the hook drop value ($FD_{(15g)}$) of a carbon fiber yarn 23 (FIG. 8) used in a stitched multiaxial reinforcing laminate, the stitching threads used to integrate the laminate are loosened, and from the laminated sheets, a 1,000 mm long carbon fiber yarn is sampled without generating fuzz and without causing twisting.

Figure 8:
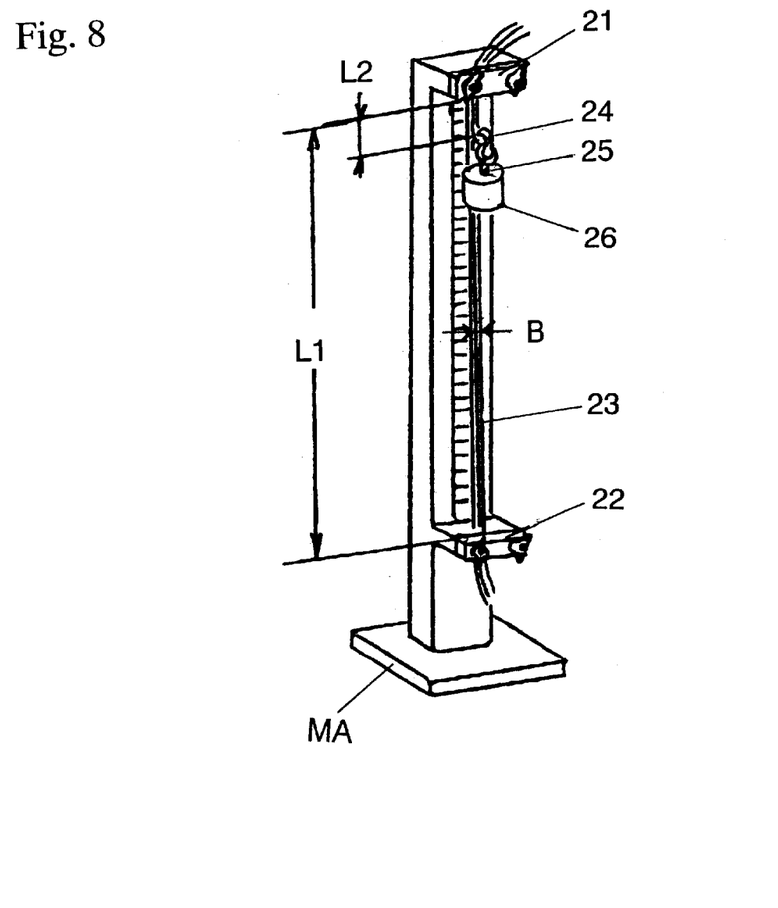
FIG. 8 is a perspective view showing a device for measuring the hook drop value.

One end of the sampled carbon fiber yarn is fastened to the upper clamp 21 of the measuring stand MA shown in FIG. 8. The thickness of the fiber bundle at the width B (mm) of the fastened carbon fiber yarn (fiber bundle) affects the hook drop value. So, one end of the carbon fiber yarn should be fastened to the upper claim 21, to ensure that the relation between the width B (mm) of the fastened fiber bundle and the fineness T (Tex) of the fiber bundle satisfies the following formula and that the thickness of the fiber bundle becomes uniform.

Formula: Width B of fiber bundle=$36 \times 10^{-4} \times T$ (in mm)

Then, with a load of 36 mg/Tex applied to the lower end of the carbon fiber yarn 23, the lower end is fastened to the lower clamp 22 with the yarn kept vertically to keep the grip interval (L1) at 950 mm without causing twisting. Then, a weight set having a weight 26 suspended by a cotton thread 25 from a metallic hook 24 (wire diameter 1 mm, radius 5 mm) (the distance between the top end of the hook 24 and the top end of the weight 26: 30 mm) is prepared, and the metallic hook 24 is hooked at the center in the width direction of the fiber bundle 23 fastened at the upper and lower ends, to keep the distance between the bottom end of the upper clamp and the top end of the metallic hook 24 (L2) at 50 mm. The hand holding the metallic hook 24 is released from the hook, and the free drop distance (the distance from said 50 mm position to the top end of the metallic hook 24 at the drop position) of the metallic hook 24 is measured.

The metallic hook 24 and the cotton thread 25 used should be as light as possible in weight, and the total weight of the metallic hook 24, the cotton thread 25 and the weight 26, i.e., the weight of the weight set should be kept at 15 g.

For the hook drop value ($FD_{(15g)}$), 10 fiber bundles should be sampled from each sheet, and the average of 30 samples should be employed as the hook drop value.

It can happen that the metallic hook 24 drops to the position of the lower clamp 22. In this case, the free drop distance is assumed to be 900 mm. For this purpose, it must be ensured that the metallic hook 24 contacts the lower clamp 22 but that the cotton thread 25 and the weight 26 are not caught at the lower clamp 22. For this measurement, the laminate should be allowed to stand in an environment of 25° C. temperature and 60% relative humidity for 24 hours, and the measurement should be carried out in an environment of 25° C. temperature and 60% relative humidity.

With regard to the advanced workability of carbon fiber yarns, to keep the yarn bundling integrity and spreadability better, it is preferable to deposit a sizing agent capable of keeping both the properties better, on the yarns.

If the amount of the deposited sizing agent is as small as 0.2 to 1.5 wt %, advanced workability can be ensured without impairing the yarn width spreadability. If the amount of the deposited sizing agent is kept in a range of 0.2 to 0.6 wt %, the yarn spreadability can be further improved, and an excellent uniform sheet can be stably obtained.

It is preferable to use carbon fiber yarns with a strength of 3,000 MPa or more and an elastic modulus of 200 GPa or more, since a CFRP with a high strength and a high elastic modulus can be obtained.

It is preferable that each sheet having the carbon fiber yarns arranged in parallel to each other in one direction in the stitched multiaxial reinforcing laminate of the invention is a thin sheet with a unit weight of 50 to 300 $g/m^2$, in which spreadable carbon fiber yarns are widened and arranged in parallel to each other in one direction at a constant pitch without forming any gap between the respectively adjacent carbon fiber yarns.

A sheet in which thin carbon fiber yarns are arranged thinly and uniformly can be easily produced if the thin carbon fiber yarns are arranged in parallel to each other at a high density without being widened in yarn width. However, it is not easy to produce a sheet in which thick tow-like carbon fiber yarns are thinly and uniformly arranged, for the reason that simply arranged thick tow-like carbon fiber yarns form large gaps between the respectively adjacently arranged carbon fiber yarns since filaments almost circular in cross sectional form are bundled to form each carbon fiber yarn.

If a laminate having large gaps existing between the respectively adjacent carbon fiber yarns is used for forming a CFRP, the gaps become resin-rich portions where no carbon fibers exist. In such a CFRP, stress concentration occurs at any of the resin-rich portions, and the portion may become a rupture-initiating point to cause rupture at a low load. Furthermore, the shrinkage caused when the resin is hardened depresses the surfaces of the resin-rich portions, not allowing a CFRP having a smooth surface to be obtained.

In the case where the stitched multiaxial reinforcing laminate of the invention is produced, if carbon fiber yarns with excellent openability of 4 cm or more in hook drop value are used, the carbon fiber yarns begin to be widened in yarn width already from the stage when they are unreeled from bobbins. In the case where a means for positively widening the yarn width is used as required, even if the pitch of the arranged carbon fiber yarns is large, the carbon fiber yarns can be widened in yarn width to a state where the filaments of the respectively adjacent carbon fiber yarns become close to each other, and a thin and uniform sheet can be obtained.

If the yarn width of each of the carbon fiber yarns constituting the sheet is kept equal to the pitch of arranged plural carbon fiber yarns, a state where no gap exists between the respectively adjacently arranged carbon fiber yarns can be obtained. On the other hand, if carbon fiber yarns respectively having a yarn width less than the pitch of the arranged carbon fiber yarns are used and widened in yarn width when the sheet is formed, the gaps between the lateral sides of the respectively adjacent carbon fiber yarns in the longitudinal direction can also be eliminated.

The pitch of the arranged carbon fiber yarns has a relation with the thickness of the carbon fiber yarns used and the required unit weight of the sheet. In the stitched multiaxial reinforcing laminate of the invention, the pitch of the arranged carbon fiber yarns is in a range of 8 to 60 mm. A more preferable pitch range is 20 to 60 mm. These values are very large compared with the values of the pitch of the arranged carbon fiber yarns in the conventional sheet.

In the stitched multiaxial reinforcing laminate of the invention, the carbon fiber yarns are widened to a yarn width equivalent to the pitch of the arranged carbon fibers. It is preferable that the yarn width of each of the carbon fibers is not less than double the original yarn width, and it is more preferable that the yarn width is double to five times the original yarn width.

In this state, a uniformly formed sheet free from any gap between the respectively adjacently arranged carbon fiber yarns and substantially free from thickness irregularity can be obtained.

The original yarn width refers to the yarn width of the carbon fiber yarn wound around a bobbin. The original yarn width is usually in a range of 4 to 12 mm.

Since the pitch of the arranged carbon fiber yarns is kept in this large range, thick carbon fiber yarns with a fineness of 1,200 to 17,000 Tex can be used, and a thin and uniform sheet can be obtained using such carbon fiber yarns.

It is preferable that the unit weight of each sheet having carbon fiber yarns arranged in one direction is 50 to 300 $g/m^2$. If the unit weight is selected in a range of 100 to 200 $g/m^2$, a general-purpose laminate can be obtained stably.

The stitched multiaxial reinforcing laminate of the invention has a feature of being substantially isotropic. If sheets are laminated in such a manner that the directions of the carbon fiber yarns in the respective sheets intersect with each other at angles of 0°, 90° and ±45° and are arranged mirror-symmetrically, a laminate consisting of total 8 sheets is obtained.

In this case, if the unit weight of the carbon fiber yarns of a sheet is more than 300 $g/m^2$, the unit weight of the carbon fiber yarns of the laminate becomes more than 2,400 $g/m^2$, and the CFRP obtained becomes thicker than necessary. It maybe difficult to impregnate such a laminate with a resin when the CFRP is formed.

On the other hand, if the unit weight of the carbon fiber yarns of a sheet is less than 50 $g/m^2$, a thin CFRP can be obtained, but even if it is attempted to obtain a sheet with a low unit weight using thick carbon fiber yarns, there is a limit in the widening of carbon fiber yarns, making it difficult to obtain a uniform sheet.

A case of using 8 sheets for forming a laminate has been described, but the sheet constitution for lamination is not limited to it. The sheet constitution for lamination can be changed as required in the number of laminated sheets, the directions of arranged carbon fiber yarns, etc. It is preferable that the unit weight of each sheet for one direction in the laminate is smaller, since the degree of freedom in lamination becomes larger.

EXAMPLES

Figure 1:
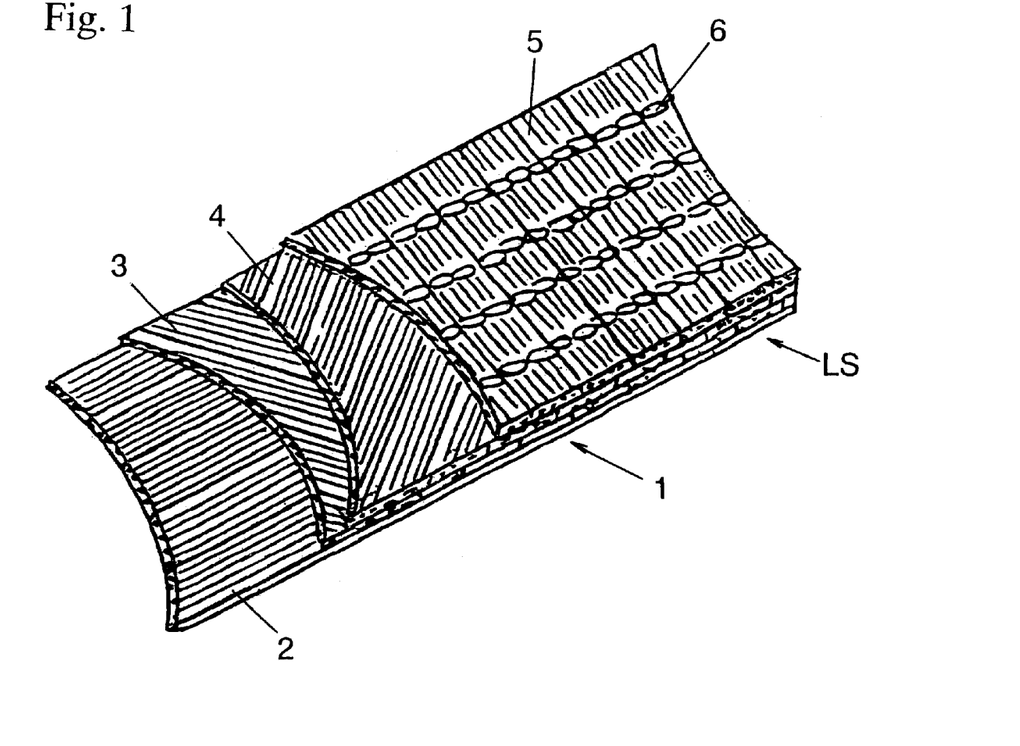
FIG. 1 is a partially sectional perspective view showing an example of the stitched multiaxial reinforcing laminate of the invention.

In FIG. 1, the stitched multiaxial reinforcing laminate 1 of the invention is a laminate in which sheets 2, 3, 4 and 5 respectively having plural carbon fiber yarns oriented in one direction at a predetermined angle are laminated and stitched integrally by means of stitching threads 6.

The carbon fiber yarns of the sheet 2 are oriented in 0° direction in reference to the direction in which the stitching threads 6 extend. The carbon fiber yarns of the sheet 3 are oriented in +45° direction. The carbon fiber yarns of the sheet 4 are oriented in −45° direction. The carbon fiber yarns of the sheet 5 are oriented in 90° direction. The laminate 1 is a pseudo-isotropic laminate in which carbon fibers are oriented in four directions in a horizontal plane.

The process for producing the laminate 1 is described later. However, the laminate 1 can be produced without undergoing the steps of bias-cutting a woven fabric and laminating the cut woven fabric pieces, unlike the conventional process. According to this process, the conventional laminate-forming step can be eliminated, and numerous carbon fiber yarns arranged in one direction can be supplied to the sheet-forming step, for forming a laminate. In this case, each sheet can have carbon fiber yarns easily arranged as desired. The laminate 1 can be used to obtain a highly reliable CFRP.

For stitching the laminate LS consisting of these sheets 2, 3, 4 and 5 integrally by means of stitching threads, stitching needles provided at constant intervals are used for letting the stitching threads 6 penetrate the laminate LS with chain stitches or 1/1 tricot stitches, etc.

The tips of the stitching needles are sharpened to prevent the carbon fiber yarns from being damaged when the needles penetrate the laminate LS.

The intervals between arranged stitching threads 6 and the length of the loop of each stitch are not especially limited, but if both are smaller, the laminate 1 is more strongly integrally stitched and improves in shape stability. However, if the integral stitching is too strong, the clamping of the laminate 1 by the stitching threads 6 becomes too large, and as a result, a problem arises that when a CFRP is formed using the laminate 1, the laminate 1 is less likely to be impregnated with a resin, to elongate the impregnation time or to leave some portions non-impregnated disadvantageously.

On the other hand, in the case where the intervals between the arranged stitching threads 6 are large, the shape of the laminate 1 becomes unstable. It is preferable that the intervals between the arranged stitching threads 6 and the length of each loop are respectively in a range of about 2 to 8 mm.

It is preferable that the stitching threads 6 are composed of fibers as thin as possible if the shape of the laminate 1 can be held, since the undulation on the surface of the laminate 1 caused by the stitching threads 6 becomes small.

The fibers of the stitching threads 6 are not especially limited, and such fibers as poalymide fibers, polyester fibers or polyaramid fibers can be used. Especially polyaramid fibers are preferable since thread breaking does not occur during stitching work because of good adhesion to the resin and large elongation. Furthermore, in view of the elongation of the stitching threads 6, it is more preferable to use crimped threads as the stitching threads 6.

Figure 2:
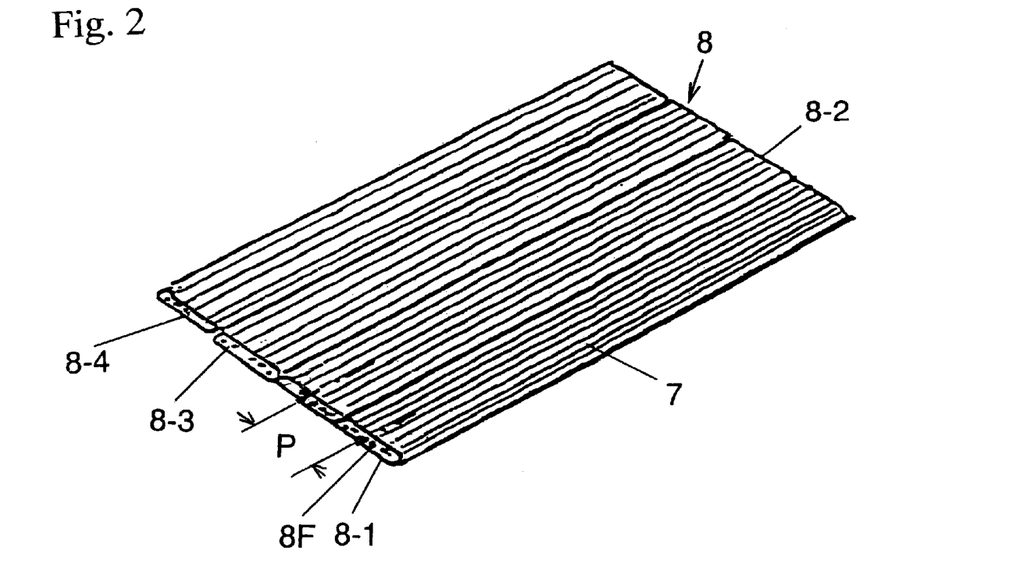
FIG. 2 is a perspective view showing an example of the sheets constituting the laminate shown in FIG. 1.

FIG. 2 shows one sheet 7 (corresponding to the sheet 2 in FIG. 1) constituting the laminate 1 shown in FIG. 1. The sheet 7 is composed of n carbon fiber yarns 8 arranged in parallel to each other in one direction. FIG. 2 shows some of arranged carbon fiber yarns 8-1, 8-2, 8-3, 8-4, . . . , 8-n.

Each of the carbon fiber yarns 8 is composed of a tow-like filament bundle consisting of numerous filaments 8F with a bundle fineness of 1,200 to 17,000 Tex, and the pitch (P) between the respectively adjacent carbon fiber yarns is as large as 8 to 60 mm. The carbon fiber yarns are arranged without any gap formed between the respectively adjacent carbon fiber yarns 8.

Each of the carbon fiber yarns 8 has a hook drop value of 4 to 80 cm, and has 0.2 to 1.5 wt % of a sizing agent deposited. The carbon fiber yarns 8 are very excellent in openability.

The carbon fiber yarns 8 are sufficiently spreadable in yarn width. So, even if the pitch (P) of the arranged carbon fiber yarns 8 is large, the carbon fiber yarns 8 can be sufficiently is widened in yarn width, and a sheet in which the carbon fiber yarns are arranged uniformly without forming any gap can be obtained.

It is preferable that the unit weight of the sheet 7 is as low as 50 to 300 g/m$^2$. Even if the sheet 7 is laminated with other identical sheets to form a pseudo-isotropic laminate, the laminate does not become massive. The laminate can be preferably used as a general-purpose reinforcing material for a CFRP.

Figure 3:
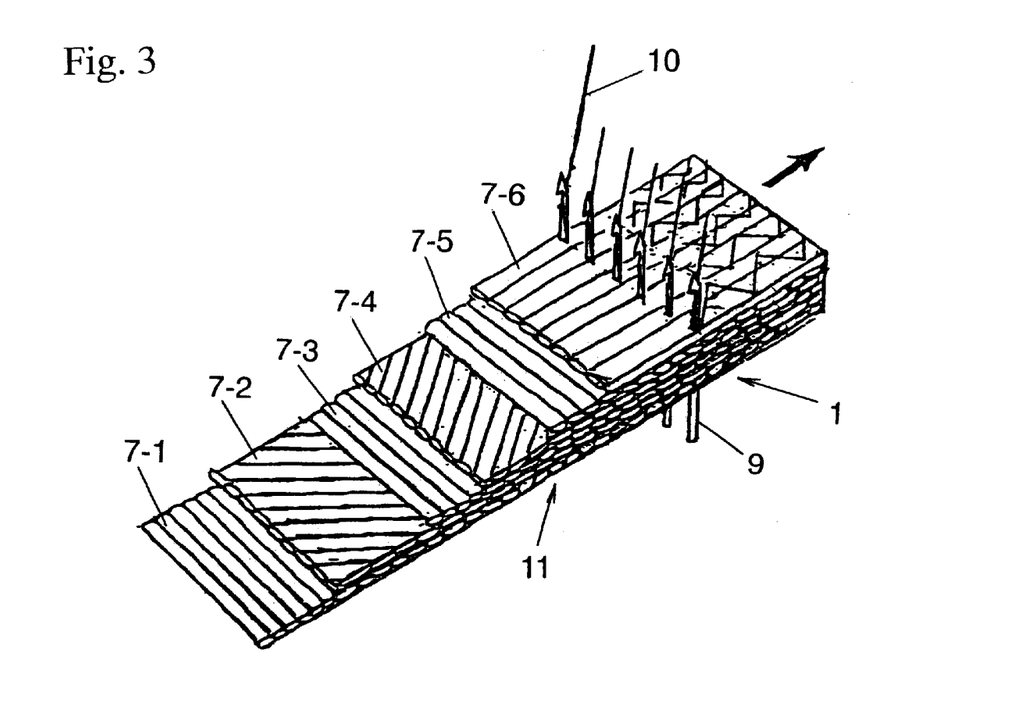
FIG. 3 is a schematic perspective view for illustrating an example of the process for producing a stitched multiaxial reinforcing laminate of the invention.

FIG. 3 shows how plural sheets 7-1, 7-2, 7-3, 7-4, 7-5 and 7-6 are stitched integrally by means of stitching threads 10.

In FIG. 3, the sheet laminate 11 consisting of laminated sheets 7-1, 7-2, 7-3, 7-4, 7-5 and 7-6 is stitched by means of the stitching needles 9 penetrating the laminate and vertically moving in the thickness direction of the laminate and the stitching threads 10 inserted into the laminate using the hooks at the tips of the needles 9. As soon as the needles 9 go down and come off from the sheet laminate 11, they also come off from the loops of the stitching threads 10 formed previously, and form new loops on the back of the sheet laminate 11. This stitching action is repeated to stitch the respective sheets 7-1, 7-2, 7-3, 7-4, 7-5 and 7-6 constituting the sheet laminate 11 integrally by means of the stitching threads 10.

Figure 4:
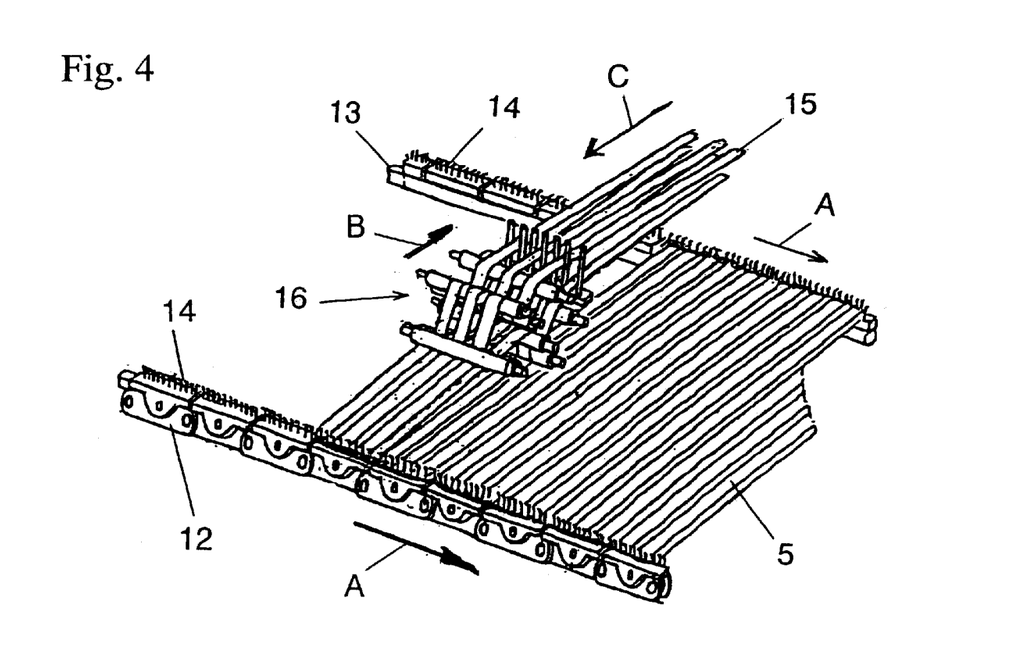
FIG. 4 is a schematic perspective view showing an example of the apparatus used for carrying out the process for producing a stitched multiaxial reinforcing laminate of the invention, in which plural carbon fiber yarns in parallel to each other in one direction are supplied while being widened in yarn width, to form a sheet.

FIG. 4 shows the method of forming a sheet in which the carbon fiber yarns 15 are arranged in the direction of 90° in reference to the direction in which the stitching threads extend (the direction indicated by arrow A of FIG. 4) (sheet 5 of FIG. 1 or sheet 7-1, 7-3 or 7-5 of FIG. 3).

In FIG. 4, plural carbon fiber yarns 15 delivered from a creel (not illustrated) are run in the direction indicated by arrow C and introduced into a guide device 16.

The guide device 16 repeats the motion of moving in the transverse direction of the stitching machine (in the direction indicated by arrow B or in the reverse direction) and the motion of moving in the direction reverse to the progress direction of an endless chain 12 or 13 (the direction indicated by arrow A) when the guide device 16 reaches either of both the sides of the stitching machine, for forming a sheet 5 in which the carbon fiber yarns 15 are oriented in one direction.

When the moving guide device 16 reaches either of both the sides of the stitching machine, the guide device 16 moves in the direction reverse to the progress direction of the chain 12 or 13, and hooks the guided carbon fiber yarns on the hook pins 14 installed on the chain 12 or 13.

The guide device 16 has a first roller group consisting of several rollers and a second roller group consisting of several rollers, and the carbon fiber yarns 15 are guided along the several rollers of either group in S shapes and run while being brought into contact with the several rollers of the group, to be widened in yarn width. If at least one roller of the several rollers of each group is a vibrating roller vibrating in the axial direction of the roller, the effect of widening the carbon fiber yarns in yarn width can be further improved preferably.

FIG. 4 shows the case where the orientation angle of the carbon fiber yarns 15 is 90° in reference to the direction in which the stitching threads 6 (FIG. 1) extend. In the case where the orientation angle of the carbon fiber yarns 15 is other than 0° (other than the case of sheet 2 of FIG. 1), for example, 45° (sheet 3 or 4 of FIG. 1), the sheet is formed by a method of reciprocating the guide device 16 in the direction of +45° or −45° in reference to the direction in which the stitching threads extend. Furthermore, for laminating sheets, the carbon fiber yarns 15 are hooked on the hook pins 14 according to a similar method over an is already formed sheet.

The laminate consisting of laminated plural sheets is supplied to a stitching section and stitched integrally by means of stitching threads.

The sheet with the carbon fiber yarns oriented in the direction of angle 0° (sheet 2 of FIG. 1) can also be formed by a method of supplying the carbon fiber yarns wound around beams simultaneously to the stitching section in 0° direction from above the stitching machine while widening the yarns in yarn width, for integrating the formed sheet with the already formed sheet laminate.

Figure 5:
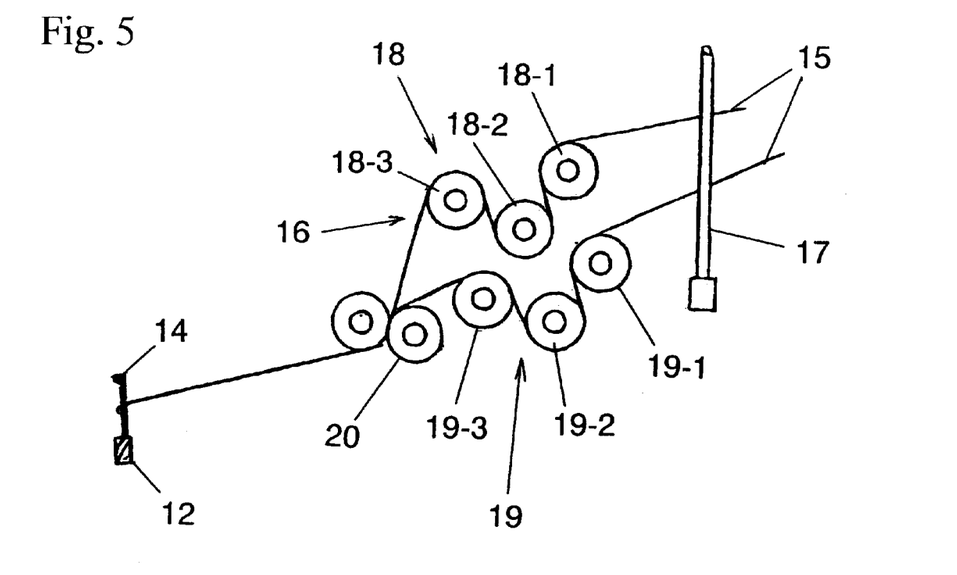
FIG. 5 is a schematic side view showing an example of the apparatus shown in FIG. 4.

In FIG. 5, the plural carbon fiber yarns 15 delivered from a creel (not illustrated) are arranged at a constant pitch in the transverse direction by means of a comb 17. Every other carbon fiber yarn 15 passing the comb 17 is supplied to upper width widening rollers 18 (rollers 18-1, 18-2 and 18-3) while the remaining every other carbon fiber yarn 15 is supplied to lower width-widening rollers 19 (rollers 19-1, 19-2 and 19-3).

While the respective carbon fiber yarns 15 pass in contact with the width-widening rollers 18-1, 18-2 and 18-3 and the width-widening rollers 19-1, 19-2 and 19-3, they are bent. The carbon fiber yarns 15 almost circular in cross sectional form when they are supplied from a creel are sequentially widened in yarn width due to the bending action whenever they pass each roller.

The width-widening rollers 18 and 19 respectively have a diameter of about 8 to 40 mm. Rollers smaller in diameter are more effective in width widening.

The respective rollers can be fixed or rotating, but since fixed rollers have a problem that the carbon fiber yarns are likely to generate fuzz due to abrasion, rotating rollers are preferable.

If the carbon fiber yarns used are well openable, they can be widened in yarn width as desired simply if they pass along the width-widening rollers 18 or 19. However, for stably producing a sheet free from any gap between the respectively adjacent carbon fiber yarns, it is desirable that, for example, the width-widening roller 18-2 and the width-widening roller 19-2 are vibrating rollers vibrating in the axial direction of the roller. The vibration promotes the yarn width-widening action. As for the vibration conditions, it is preferable that the vibration frequency is in a range of 10 to 100 Hz and that the vibration amplitude is in a range of 2 to 20 mm. It is preferable to use a higher vibration frequency when the carbon fiber yarn running speed is higher.

In the above, a case where the number of width-widening rollers of each series is three, but for further widening the yarn width, the number of width-widening rollers and the number of vibration rollers can be increased.

The yarn width-widening action widens the yarn width up to at least larger than the pitch of the carbon fiber yarns 15 arranged when they pass the comb 17, and the widened carbon fiber yarns are supplied to nip rollers 20. Since the carbon fiber yarns 15 supplied to the nip rollers 20 are widened in yarn width to larger than the pitch of the carbon fiber yarns passing the comb 17, the lateral sides of the respectively adjacent carbon fiber yarns 15 are overlapped when they are nipped between the nip rollers 20. After the carbon fiber yarns 15 pass the nip rollers 20, they are supplied to a sheet-forming step.

In the process for producing a stitched multiaxial reinforcing laminate of the invention, it is an essential condition to widen the carbon fiber yarns in yarn width. It is preferable that the yarn width of each of the carbon fiber yarns is widened to not less than double the original yarn width. It is more preferable that the yarn width is widened to double to five times the original yarn width.

Usually since a carbon fiber yarn is wound around a bobbin with the yarn width kept as compact as possible, the original yarn width is very narrow. To obtain the stitched multiaxial reinforcing laminate as uniform as possible in the invention, it is preferable to widen the yarn width greatly. The original yarn width refers to the yarn width measured on a bobbin having the carbon fiber yarn wound around it.

The carbon fiber yarns 15 are guided being nipped between the nip rollers 20. So, even if the guide device 16 moves in the transverse direction or machine direction, the carbon fiber yarns are reliably guided with the thin sheet form kept, for forming a sheet. Thus, a sheet free from any gap between the respectively adjacent carbon fiber yarns 15 can be stably formed.

In the above, in the guide device 16, the carbon fiber yarns 15 are divided into a group of every other yarn and the other group of every other yarn when supplied to either the width-widening roller 18 or 19, but the carbon fiber yarns 15 can be supplied to the width-widening rollers as a single group without being divided into two groups, for being widened in yarn width.

Figure 6:
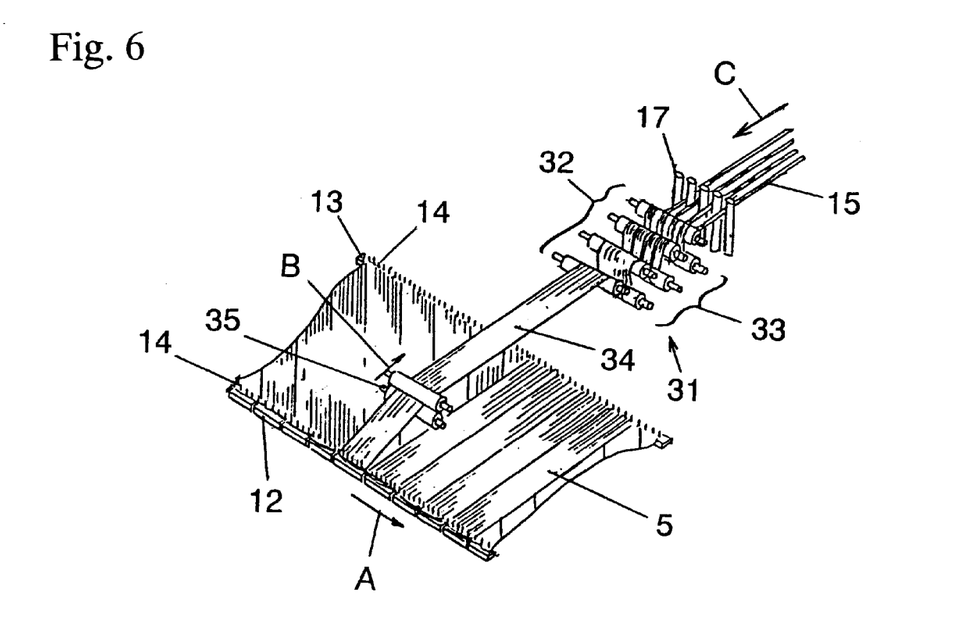
FIG. 6 is a schematic perspective view showing another example of the apparatus used for carrying out the process for producing a stitched multiaxial reinforcing laminate of the invention, in which plural carbon fiber yarns in parallel to each other in one direction are supplied while being widened in yarn width, to form a sheet.

FIG. 6 shows the case of using width-widening rollers for a single group of carbon fiber yarns. Plural carbon fiber yarns (four yarns in FIG. 6) are supplied through a comb 17 to a width-widening roller device 31 in the direction indicated by arrow C. The width-widening roller device 31 consists of upper rollers 32 and lower rollers 33. The carbon fiber yarns 15 supplied to the width-widening roller device 31 pass along the upper rollers 32 and the lower rollers 33 alternately sequentially. During the passage, the carbon fiber yarns 15 are bent and widened in yarn width. The carbon fiber yarns 15 coming out of the width-widening device 31 are formed as a sheet 34, and while they are nipped between nip rollers 35, a sheet 5 is formed with the movement of the nip rollers 35 in the direction indicated by arrow B. The movements of chains 12 and 13 and pins 14 are as described for the device shown in FIG. 3.

As for the method of supplying the carbon fiber yarns of 0° in orientation angle, since the carbon fiber yarns necessary for the width of the laminate are supplied simultaneously from beams, the carbon fiber yarns can be wound around beams while being widened in yarn width according to the above-mentioned method. Alternatively, the carbon fiber yarns wound around beams without being widened in yarn width can also be supplied while being widened in yarn width at a position above the stitching machine according to the above-mentioned method.

Figure 7:
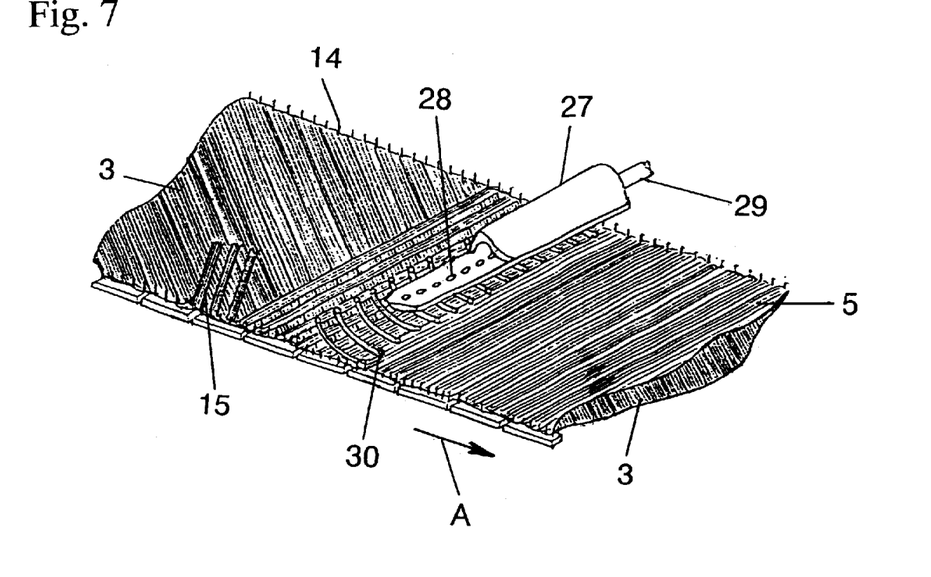
FIG. 7 is a perspective view showing an example of the air blower used for carrying out the process for producing a stitched multiaxial reinforcing laminate of the invention, in which arranged carbon fiber yarns are widened in yarn width by means of air blow.

FIG. 7 illustrates a method of widening the tow-like carbon fiber yarns 15 after they have been arranged at an equal pitch. Tow-like carbon fiber yarns 15 are arranged in 90° direction on a sheet 3 in which carbon fiber yarns 15 are arranged in +45° direction, and air is blown toward the laminated carbon fiber yarns 15, for widening them in yarn width.

In FIG. 7, an air nozzle 27 is positioned immediately after the tow-like carbon fiber yarns 15 have been arranged in 90° direction by the guide device (not illustrated).

In the under face of the air nozzle 27, plural air blow holes 28 are formed at an equal pitch in one row in the transverse direction of the stitching machine. The compressed air supplied from the air supply hole 29 of the air nozzle 27 is blown from the blow holes 28 toward a carbon fiber yarn 15, to open the filaments gathered like a tow and to widen the carbon fiber yarn 15 in yarn width.

It is preferable that the nozzle holes 28 are formed at least in one row in the orienting direction of the carbon fiber yarn 15. In this constitution, one carbon fiber yarn 15 is opened simultaneously in the longitudinal direction, and can be widened in yarn width reliably without disturbing the respective filaments.

The size and pitch of the nozzle holes 28 relate to the air pressure used, but in view of the relation between the openability of carbon fiber yarns 15 and the air consumption, it is preferable that the diameter of the nozzle holes 28 is in a range of 0.1 to 1.0 mm, and that the pitch is in a range of 5 to 50 mm.

If a porous guide 30 is installed on the arranged tow-like carbon fiber yarn 15 and kept in light contact with the carbon fiber yarn, to press the carbon fiber yarn 15 in a plane, it can be prevented that when air is blown to the carbon fiber yarn 15, the carbon fiber yarn 15 is swirled or that the filaments are disturbed in orientation.

The porous guide 30 can be, for example, thin metallic wires or synthetic resin wires arranged at equal intervals in the transverse direction of the sheet 5, or a network. It is only required that the porous guide has pores through which the blown air passes to reach the carbon fiber yarn 15.

In the state where the guide 30 is kept in light contact with the carbon fiber yarn 15, the carbon fiber yarn 15 must slide under the guide 30. So, it is preferable that the surface of the guide 30 has a shape to allow easy sliding without catching, or is made of a material with such a property.

The guide 30 shown in FIG. 7 is fixed at the position by means of a holder (not illustrated).

The above description refers to a case of producing a sheet in which the carbon fiber yarns 15 are oriented in 90° direction, but also when a sheet in which the carbon fiber yarns 15 are oriented in any other angle direction than 90° direction, the air nozzle 27 can be used to widen the yarn width. In this case, if the direction in which the nozzle holes 28 are arranged agrees with the direction in which the carbon fiber yarns 15 are arranged, the carbon fiber yarns can be effectively widened in yarn width.

The air nozzle 27 can be fixed to ensure that it comes at the position where each tow-like carbon fiber yarn 15 has been just completely arranged, but the air nozzle 27 can also be oscillated at the position to blow air plural times to the same carbon fiber yarn 15. In this case, the carbon fiber yarn 15 can be further opened and stably widened in yarn width.

The above has described a case where the stitched multiaxial reinforcing laminate of the invention is produced by laminating only the sheets composed of carbon fiber yarns. However, for example, a non-woven fabric such as a chopped strand mat of glass fiber yarns can also be laminated on the outer surface of the laminate 1 (FIG. 1), and the entire laminate can be stitched integrally.

This lamination constitution can provide a laminate better in surface smoothness, and a CFRP using it can also be produced.

INDUSTRIAL APPLICABILITY

The stitched multiaxial reinforcing laminate of the invention use thick tow-like highly spreadable carbon fiber yarns, and the carbon fiber yarns are widened greatly to at least the pitch of the arranged yarns, to form a sheet free from any gap between the respectively adjacent carbon fiber yarns. The sheet is laminated with other identical sheets, and the laminate is stitched integrally using stitching threads. Therefore, the respective filaments constituting the respective carbon fiber yarns in the laminate are uniformly dispersed and arranged in the laminate even though the fineness of the original carbon fiber yarns is large. The laminate and a matrix resin can be processed to obtain an inexpensive CFRP in which the carbon fiber yarns are uniformly dispersed as reinforcing fibers.

What is claimed is:

1. A stitched multiaxial reinforcing laminate, in which plural sheets, each having plural carbon fiber yarns arranged in parallel to each other, are laminated and stitched integrally by means of stitching threads, to ensure that the directions of the arranged carbon fiber yarns of the respective sheets are kept at different angles against a reference direction, characterized in that the carbon fiber yarns have a fineness of 1,200 to 17,000 Tex respectively and are arranged at a pitch of 8 to 60 mm, with the yarn width of each of the carbon fiber yarns widened to the pitch of the arranged carbon fiber yarns.

2. A stitched multiaxial reinforcing laminate according to claim 1, wherein the pitch of the arranged carbon fiber yarns is in a range of 20 to 60 mm.

3. A stitched multiaxial reinforcing laminate according to claim 1 or 2, wherein the yarn width of each of the carbon fiber yarns is not less than double the original yarn width.

4. A stitched multiaxial reinforcing laminate according to claim 3, wherein the yarn width of each of the carbon fiber yarns is double to five times the original yarn width.

5. A stitched multiaxial reinforcing laminate according to any one of claim 1, wherein the hook drop value of the carbon fiber yarns is in a range of 4 to 80 cm.

6. A stitched multiaxial reinforcing laminate according to any one of claim 1, wherein a sizing agent is added to the carbon fiber yarns, and the amount of the deposited sizing agent is in a range of 0.2 to 1.5 wt %.

7. A stitched multiaxial reinforcing laminate according to claim 6, wherein the amount of the deposited sizing agent is in a range of 0.2 to 0.6 wt %.

8. A stitched multiaxial reinforcing laminate according to any one of claim 1, wherein the unit weight of the carbon fibers in each of the sheets is in a range of 50 to 300 g/m$^2$.

9. A stitched multiaxial reinforcing laminate according to is claim 8, wherein the unit weight is in a range of 100 to 200 g/m$^2$.

10. A stitched multiaxial reinforcing laminate according to any one of claim 1, wherein at least one sheet of the plural sheets has the carbon fiber yarns arranged substantially at an angle of 0° in reference to the direction in which the stitching threads extend, and at least one sheet of the plural sheets has the carbon fiber yarns arranged substantially at an angle of 90° in reference to the direction in which the stitching threads extend.

11. A stitched multiaxial reinforcing laminate according to any one of claim 1, wherein at least one sheet of the plural sheets has the carbon fiber yarns arranged substantially at an angle of +45° in reference to the direction in which the stitching threads extend, and at least one sheet of the plural sheets has the carbon fiber yarns arranged substantially at an angle of −45° in reference to the direction in which the stitching threads extend.

12. A stitched multiaxial reinforcing laminate according to any one of claim 1, that contains at least one non-woven fabric layer composed of reinforcing fibers.

13. A fiber-reinforced plastic comprising a matrix resin and the stitched multiaxial reinforcing laminate as set forth in any one of claim 1.

14. A process for producing a stitched multiaxial reinforcing laminate comprising a carbon fiber yarn-arranging step of arranging plural carbon fiber yarns respectively having a fineness of 1,200 to 17,000 Tex at a pitch of 8 to 60 mm, with the yarn width of each of the carbon fiber yarns widened to the pitch of the arranged yarns in one direction, a sheet-forming step of forming the arranged carbon fiber yarns into sheets respectively with a carbon fiber yarn unit weight of 50 to 300 g/m$^2$, a sheet-laminating step of laminating the formed plural sheets to ensure that the directions of the arranged carbon fiber yarns of the respective sheets are kept at different angels against a reference direction, and an integrating step of stitching the obtained sheet laminate integrally by means of stitching threads.

15. A process for producing a stitched multiaxial reinforcing laminate according to claim 14, wherein the unit weight is in a range of 100 to 200 g/m$^2$.

16. A process for producing a stitched multiaxial reinforcing laminate according to claim 14 or 15, wherein, in the carbon fiber yarn-arranging step, the carbon fiber yarns pass along plural width-widening rollers provided in the running direction, to be bent and widened in yarn width.

17. A process for producing a stitched multiaxial reinforcing laminate according to claim 16, wherein at least one of the plural width-widening rollers is a vibrating roller vibrating in the axial direction of the roller, and the carbon fiber yarns passing along it are widened in yarn width by the vibration.

18. A process for producing a stitched multiaxial reinforcing laminate according to claim 17, where the vibration frequency of the vibrating roller is in a range of 10 to 100 Hz.

19. A process for producing a stitched multiaxial reinforcing laminate according to claim 14, wherein in the sheet-forming step, a first width-widening roller device consisting of plural width-widening rollers and a second width-widening roller device consisting of plural width-widening rollers are used, that the numerous carbon fiber yarns arranged at a predetermined pitch are supplied to the first and second width-widening devices in such a manner that every other yarn is supplied to either of the width-widening devices while the remaining every other yarn is supplied to the other width-widening device, that the carbon fiber yarns are widened to wider than the pitch of the yarns arranged when supplied, and that the carbon fiber yarns delivered from the respective width-widening roller devices are positioned adjacently to each other in the formed sheet.

20. A process for producing a stitched multiaxial reinforcing laminate according to claim 14, where a fluid is blown to the carbon fiber yarns for widening them in yarn width at a position between the carbon fiber yarn-arranging step and the sheet-forming step.

21. A process for producing a stitched multiaxial reinforcing laminate according to claim 20, wherein the fluid is air.

22. A process for producing a stitched multiaxial reinforcing laminate according to claim 21, wherein the air is blown from plural blow holes arranged at least in one row in parallel to the orienting direction of the carbon fiber yarns.

23. A process for producing a stitched multiaxial reinforcing laminate according to any one of claims 20 through 22, wherein the fluid is blown from above a porous guide placed above each of the arranged carbon fiber yarns.

24. A process for producing a stitched multiaxial reinforcing laminate according to claim 23, wherein the under surface of the porous guide is kept in contact with the upper surface of the arranged carbon fiber yarn.

25. A process for producing a stitched multiaxial reinforcing laminate according to claim 14, wherein the yarn width of each of the arranged carbon fiber yarns is not less than double the original yarn width of each of the carbon fiber yarns.

26. A process for producing a stitched multiaxial reinforcing laminate according to claim 25, wherein the yarn width of each of the arranged carbon fiber yarns is double to five times the original yarn width of each of the carbon fiber yarns.

27. A process for producing a stitched multiaxial reinforcing laminate according to claim 14, wherein the orientation angles of the carbon fiber yarns in the sheets are at least two angles selected from 0°, ±45° and 90° in reference to the direction in which the stitching threads extend.

* * * * *